O. WINKELMILLER & E. C. BERNERS.
GLUE AND MUCILAGE RECEPTACLE.
APPLICATION FILED JULY 18, 1911.
1,048,255.
Patented Dec. 24, 1912.
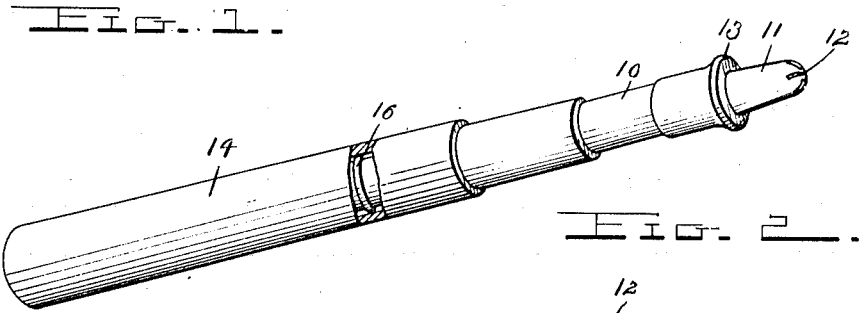
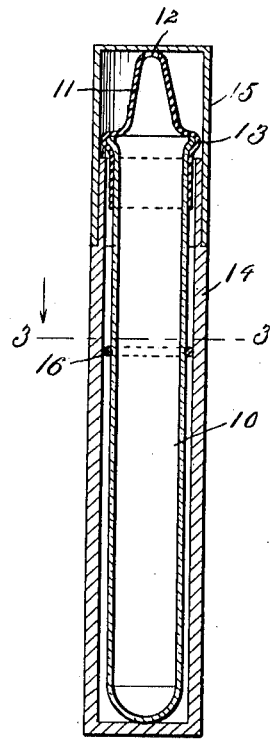
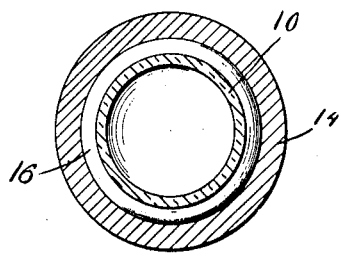
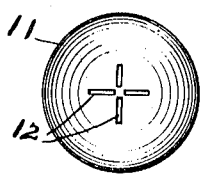
Witnesses
Inventors
Oscar Winkelmiller
Edward C. Berners
By Victor J. Evans
Attorney

UNITED STATES PATENT OFFICE.

OSCAR WINKELMILLER AND EDWARD C. BERNERS, OF TWO RIVERS, WISCONSIN.

GLUE AND MUCILAGE RECEPTACLE.

1,048,255.   Specification of Letters Patent.   Patented Dec. 24, 1912.

Application filed July 18, 1911. Serial No. 639,207. REISSUED

*To all whom it may concern:*

Be it known that we, OSCAR WINKELMILLER and EDWARD C. BERNERS, citizens of the United States, residing at Two Rivers, in the county of Manitowoc and State of Wisconsin, have invented new and useful Improvements in Glue and Mucilage Receptacles, of which the following is a specification.

An object of the invention is to provide a receptacle, particularly adapted to contain mucilage, a container for the receptacle and a retainer for retaining the receptacle within the container.

For the purpose mentioned, use is made of a receptacle, a distributer for engagement with the open end of the receptacle and adapted to constitute a closure, the said distributer being provided with slots for permitting the exit of a fluid in the receptacle, a container adapted to contain the receptacle and act as a holder and retaining means for releasably retaining the receptacle within the container.

Reference is to be had to the accompanying drawings constituting a part of this specification, in which similar characters of reference denote corresponding parts in all the views, and in which—

Figure 1 is a perspective view showing the receptacle partially withdrawn from the container, parts of the container being broken away to disclose the retaining means. Fig. 2 is a vertical longitudinal sectional view showing the receptacle within the container, with a cover attached to the container. Fig. 3 is a horizontal transverse sectional view taken on the line 3—3 in Fig. 1, looking in tne direction of the arrow. Fig. 4 is a plan view of the brush body showing the slits therein.

Referring more particularly to the views, we provide a receptacle 10 having preferably a tubular formation and connected with the open end of the receptacle 10 to normally close the same is a distributer 11, preferably consisting of a flexible rubber hood, the said distributer being provided with a plurality of spaced slits 12 adapted to permit the exit of a fluid from the receptacle 10 and a flange 13 formed on the distributer, the mentioned flange being adapted to receive the upper end of the receptacle 10.

The receptacle 10 is adapted to repose within a container 14 provided with a cover 15 and mounted to encircle the receptacle 10 is a circular retainer 16, preferably made of rubber or a similar flexible material, the said retainer being adapted to engage the inner periphery of the container 14 when the receptacle is disposed within the container.

In the use of our device, the retainer 16 is first mounted to encircle the receptacle and the receptacle is then disposed within the container 14 as shown in Fig. 2, the receptacle being so positioned in the container 14 that the distributer 11 will extend a distance beyond the upper edge of the container, the cover 15 being provided to inclose the distributer when the same is not in use. Now assuming that the receptacle 10 is filled with a mucilage, the slots 12 in the distributer 11 are covered with a sealing substance such as wax or paraffin and after the receptacle 10 has been positioned in the container 14 as mentioned, the cover 15 is applied to the container 14 and the device is then ready for the commercial market.

When it is desired to use the mucilage contained in the receptacle 10, the cover 15 is first removed and by exerting a pressure on the distributer 11 and holding the container 14 so that the distributer will extend downwardly and abut against the article to be glued, the pressure exerted on the distributer will break the sealing substance, thus permitting the liquid mucilage to flow outwardly from the receptacle through the slits 12, our device being used in a manner similar to that of an ordinary brush to spread the mucilage over an article upon which the same is to be used. When a sufficient quantity of mucilage has been used, the cover 15 is reapplied to the container 14 to inclose the distributer 11 and as will be readily understood, the slits 12 will soon become sealed, owing to a small amount of mucilage remaining on the distributer and which will become hard, thus sealing the slits 12 in a manner similar to that of the paraffin or wax heretofore mentioned. When it is desired to remove the receptacle 10 from the container 14 for the purpose of heating the receptacle to thin the mucilage contained therein, the receptacle 10 can be easily pulled outwardly from the container 14 although the retainer 16 will normally tend to frictionally retain the receptacle 10 within the container 14 and when our device is used in the manner described heretofore the container 14 will act as a handle for the distributer 11 as will be readily understood.

As shown in Fig. 4 the slits 12 of the distributer 11 are spaced apart and are disposed at relatively right angles. With a construction of this kind, when pressure is exerted on the distributer thus partially collapsing the same, the slits 12 will tend to open more easily and thus permit the fluid to flow freely from the receptacle 10.

Having thus fully described the invention, what we claim as new, is:—

1. As an article of manufacture the combination with a container, of a receptacle adapted to contain a fluid and removably mounted within the container, a retainer mounted to encircle the said receptacle and adapted to engage the container when the receptacle is disposed therein to frictionally retain the receptacle in engagement with the container, a slotted distributer secured to the open end of the receptacle to normally close the same and a cover for removable engagement with the container and adapted to inclose the said distributer.

2. In combination, a container, a receptacle adapted to contain a fluid and removably mounted within the container, a retainer mounted to encircle the said receptacle and adapted to engage the container when the receptacle is disposed therein to frictionally retain the receptacle in engagement with the container and a flexible distributer mounted to close the open end of the said receptacle, the said distributer being provided with spaced slits disposed at relatively right angles in the upper end of the said distributer.

In testimony whereof we affix our signatures in presence of two witnesses.

OSCAR WINKELMILLER.
EDWARD C. BERNERS.

Witnesses:
 Geo. H. Dicke,
 F. W. Dicke.